(12) United States Patent
Haywood et al.

(10) Patent No.: US 9,508,354 B2
(45) Date of Patent: Nov. 29, 2016

(54) MEDIA SYNCHRONISATION SYSTEM (71) Applicant: Intrasonics S.a.r.l., Luxembourg (LU)

(72) Inventors: Peter Haywood, Harston (GB); Michael Raymond Reynolds, Harston (GB); Peter John Kelly, Harston (GB); Nedeljko Cvejic, Harston (GB); David John Barrott, Harston (GB); Stephen Starkie, Harston (GB)

(73) Assignee: Intrasonics S.á r.l., Luxembourg (LU)

( * ) Notice: Subject to any disclaimer, the term of this patent is extended or adjusted under 35 U.S.C. 154(b) by 0 days.

(21) Appl. No.: 14/394,247

(22) PCT Filed: Apr. 12, 2013

(86) PCT No.: PCT/GB2013/050956
§ 371 (c)(1),
(2) Date: Oct. 13, 2014

(87) PCT Pub. No.: WO2013/153405
PCT Pub. Date: Oct. 17, 2013

(65) Prior Publication Data
US 2015/0081311 A1  Mar. 19, 2015

(30) Foreign Application Priority Data

Apr. 13, 2012  (GB) .................................. 1206564.5

(51) Int. Cl.
*G10L 19/008*  (2013.01)
*G10L 19/018*  (2013.01)
*H04N 21/2389*  (2011.01)
(Continued)

(52) U.S. Cl.
CPC ............ *G10L 19/018* (2013.01); *H04H 20/18* (2013.01); *H04N 21/23892* (2013.01); *H04N 21/41407* (2013.01); *H04N 21/42203* (2013.01); *H04N21/4394* (2013.01); *H04N 21/8106* (2013.01); *H04N 21/8547* (2013.01)

(58) Field of Classification Search
CPC  G10L 19/018; H04H 20/18; H04N 21/8106; H04N 21/4394; H04N 21/41407; H04N 21/8547; H04N 21/23892; H04N 21/42203
USPC ......................... 704/3–7, 203–277, 500–504
See application file for complete search history.

(56) References Cited

U.S. PATENT DOCUMENTS

2003/0012290 A1* 1/2003 Fimoff .................. H04L 1/0054
375/265

FOREIGN PATENT DOCUMENTS

CN  102265536 A  11/2011
WO  WO 02/45273  6/2002
(Continued)

OTHER PUBLICATIONS

International Search Report and Written Opinion for International Application. No. PCT/GB2012/0050956 mailed Nov. 21, 2013 (3 pages).

(Continued)

*Primary Examiner* — Marcellus Augustin
(74) *Attorney, Agent, or Firm* — Merchant & Gould P.C.

(57) ABSTRACT

A communications system distributes code word pairs within the audio of a television or radio program or the like. Each pair of code words includes an ID code word that is the same for a given program and a synchronization code word that is unique within the program. A portable user device is able to synchronize itself to the program using the embedded synchronization code words.

18 Claims, 7 Drawing Sheets (51) Int. Cl.
H04N 21/414 (2011.01)
H04N 21/422 (2011.01)
H04N 21/439 (2011.01)
H04N 21/81 (2011.01)
H04N 21/8547 (2011.01)
H04H 20/18 (2008.01)

(56) References Cited

FOREIGN PATENT DOCUMENTS

| | | |
|---|---|---|
| WO | WO 2007/072327 | 6/2007 |
| WO | WO 2008/145994 | 12/2008 |
| WO | WO 2009/144470 | 12/2009 |
| WO | 2010/048458 A2 | 4/2010 |
| WO | WO 2010/054222 | 5/2010 |

OTHER PUBLICATIONS

Unknown. "AXON Audio Watermarking (SyncNow ©) Audio watermarking for Second Screen SyncNow© with the Synapse DAW77 Module." 2002. pp. 1-13.

Office Action issued in Chinese Patent Application No. 201380019830.2, mailed May 17, 2016.

* cited by examiner

MEDIA SYNCHRONISATION SYSTEM

This application is a National Stage Application of PCT/GB2013/050956, filed 12 Apr. 2013, which claims benefit of Serial No. 1206564.5, filed 13 Apr. 2012 in Great Britain and which applications are incorporated herein by reference. To the extent appropriate, a claim of priority is made to each of the above disclosed applications.

BACKGROUND

This invention relates to methods and apparatus for embedding code words in an audio signal and to methods and apparatus for synchronising a device to the audio signal using the embedded code words. The invention has particular, but not exclusive relevance to communications systems in which a portable user device, such as a computer tablet or a cellular telephone, is provided with data via an acoustic data channel.

The applicant has proposed a number of acoustic data communication systems. Examples of earlier systems can be found in WO2008/145994, WO2009/144470 and WO02/45273, which describe systems in which hidden data can be transmitted to a portable user device (such as a cellular telephone) within the audio of a television or radio programme that may be being delivered over a broadcast channel or from a local storage device (DVD etc). In the present context, the data is hidden in the sense that it is encoded in order to try to hide the data in the audio so that it is not obtrusive to the user. As those skilled in the art will appreciate, the acceptable level of audibility of the data will vary depending on the application and the user involved. Various techniques are described in these earlier patent applications for encoding the data within the audio, including spread spectrum encoding, echo modulation, critical band encoding etc. Any of these data hiding techniques may be used in the present invention.

SUMMARY

One aim of the invention is to provide alternative, and in some ways improved, techniques for hiding the data in the audio and techniques for recovering the hidden data from the acoustic sound.

According to one aspect, the present invention provides a method of embedding code words into an audio signal, the method comprising: receiving pairs of code words, each pair of code words comprising an ID code word and a synchronisation code word; encoding the code words of each pair of code words separately to form encoded code word signals; receiving an audio signal; and combining the encoded code word signals with different portions of the received audio signal to form a modified audio signal that carries the pairs of code words distributed within the audio signal.

In one embodiment, the ID code words of all the pairs of code words for a given audio signal are the same and each synchronisation code word for the audio signal is unique. The pairs of code words may be continuously encoded within the audio signal or they may be distributed throughout the audio in a distributed manner.

Where the audio signal comprises one or more break points, one or more additional synchronisation code words are preferably encoded into the audio signal after a break point, to facilitate re-synchronisation after the break.

The encoding step typically generates timing information associated with at least the synchronisation code words that identifies the point in time where the code word is encoded within the audio signal. This timing information may then be provided to a receiving device for use in synchronising the device to the incoming audio.

The invention also provides a method of synchronising a device with an audio signal having encoded pairs of code words embedded therein, each pair of code words including an ID code word and a synchronisation code word, the method comprising: receiving the audio signal with the encoded pairs of code words; and synchronising the device with the audio signal by detecting: i) an ID code word and a synchronisation code word from one pair of code words; or ii) an ID code word from one pair of code words and a synchronisation code word from another pair of code words.

The method may further comprise using a detected ID code word to retrieve timing information relating to an expected time for detected synchronisation code words and determining a difference in time between an expected time for a detected synchronisation code word and an actual time of the detected synchronisation code word and using the determined difference to synchronise the device to the audio signal. In this case, the timing information may define an expected time relative to a defined point within the audio signal, such as the start of the audio signal. The determined difference may be used to alter a timer of the device.

Action information may be stored in the device that defines one or more actions that the device should take at defined times during the reception of the audio signal.

In one embodiment, a first decoding technique is used to decode the encoded code words in the received audio signal before synchronisation and a second decoding technique is used to decode the encoded code words after synchronisation.

In another embodiment, a first decoding technique is used to decode the encoded code words in the received audio signal and a second decoding technique is used to decode the encoded code words in the event that an expected code word is not detected.

The first decoding technique may be a blind decoding technique and the second decoding technique may be a non-blind decoding technique.

In one embodiment, after synchronising the device to the audio and in response to a skip within the received audio signal, maintaining the ID code word and re-synchronising with the audio signal by detecting a synchronisation code word. The skip may be a fast forward or a rewind operation.

The invention also provides an apparatus for embedding code words within an audio signal, the apparatus comprising: means for receiving pairs of code words, each pair of code words comprising an ID code word and a synchronisation code word; means for encoding the code words of each pair of code words separately to form encoded code word signals; means for receiving an audio signal; and means for combining the encoded code word signals with different portions of the received audio signal to form a modified audio signal that carries the pairs of code words distributed within the audio signal.

The ID code words of all the pairs of code words for a given audio signal may be the same and each synchronisation code word for the audio signal may be unique.

The pairs of code words may be continuously encoded within the audio signal.

Where the audio signal comprises one or more break points, the means for combining the encoded code word signals combines the signals so that one or more additional synchronisation code words are encoded into the audio signal after a break point.

In one embodiment, the means for encoding generates timing information associated with at least the synchronisation code words, which timing information identifies the timing within the audio signal where the code word is encoded.

The present invention also provides an apparatus for synchronising a device with an audio signal having encoded pairs of code words embedded therein, each pair of code words including an ID code word and a synchronisation code word, the apparatus comprising: means for receiving the audio signal with the encoded pairs of code words; and means for synchronising the device with the audio signal by detecting: i) an ID code word and a synchronisation code word from one pair of code words; or ii) an ID code word from one pair of code words and a synchronisation code word from another pair of code words.

The apparatus may further comprise means for using a detected ID code word to retrieve timing information relating to an expected time for detected synchronisation code words; means determining a difference in time between an expected time for a detected synchronisation code word and an actual time of the detected synchronisation code word and means for using the determined difference to synchronise the user device to the audio signal.

The timing information may define an expected time relative to a defined point within the audio signal, such as the start of the audio signal.

The apparatus may also comprise means for using the determined difference to alter a timer of the device. Action information may also be stored that defines one or more actions that the device should take at defined times during the reception of the audio signal.

In one embodiment, the apparatus has means for using a first decoding technique to decode the encoded code words in the received audio signal before synchronisation and means for using a second decoding technique to decode the encoded code words after synchronisation.

In another embodiment, the apparatus has means for using a first decoding technique to decode the encoded code words in the received audio signal and means for using a second decoding technique to decode the encoded code words in the event that an expected code word is not detected.

The first decoding technique may be a blind decoding technique and the second decoding technique may be a non-blind decoding technique.

The apparatus may further comprise means for re-synchronising the device with the audio signal in response to a skip event within the received audio signal by maintaining a previously decoded ID code word and by detecting a new synchronisation code word after the skip event. The skip event may be a fast forward event or a rewind event.

The present invention also provides an apparatus for embedding code words within an audio signal, the apparatus comprising: an encoder configured to receive pairs of code words, each pair of code words comprising an ID code word and a synchronisation code word and configured to encode the code words of each pair of code words separately to form encoded code word signals; and a combiner configured to combine the encoded code word signals with different portions of the received audio signal to form a modified audio signal that carries the pairs of code words distributed within the audio signal.

The present invention also provides an apparatus for synchronising a device with an audio signal having encoded pairs of code words embedded therein, each pair of code words including an ID code word and a synchronisation code word, the method comprising: a receiver configured to receive the audio signal with the encoded pairs of code words; and a synchronisation controller configured to synchronise the device with the received audio signal by detecting: i) an ID code word and a synchronisation code word from one pair of code words; or ii) an ID code word from one pair of code words and a synchronisation code word from another pair of code words.

The apparatus may include a microphone for receiving an acoustic signal and the receiver may be configured to receive an audio signal obtained from the microphone.

In one embodiment, the code words are encoded within the audio signal using one or more of spread spectrum encoding, echo modulation and critical band encoding so that the code words are unobtrusive to a user listening to the audio. In the case of echo modulation the polarity and/or time lag and/or amplitude of echoes may be changed based on the data to be hidden within the audio.

The invention also provides a computer program product comprising computer implementable instructions for causing a programmable computer device to perform all the method steps discussed above or to become configured as the above described apparatus.

BRIEF DESCRIPTION OF THE DRAWINGS

These and other aspects of the invention will become apparent from the following detailed description of exemplary embodiments which are described with reference to the accompanying drawings, in which:

FIG. 2b is a block diagram illustrating the main components of an FEC encoder forming part of the encoder shown in FIG. 2a;

FIG. 2c is a timing sequence illustrating the way in which identification (ID) codes and synchronisation codes are added to the audio signal by the encoder shown in FIG. 2a;

FIG. 2d illustrates the way in which the code words are embedded within the audio signal by the encoder shown in FIG. 2a;

FIG. 4b is a block diagram illustrating the main processing blocks of a code word extraction module shown in FIG. 4a;

DETAILED DESCRIPTION

Overview

Figure 1:
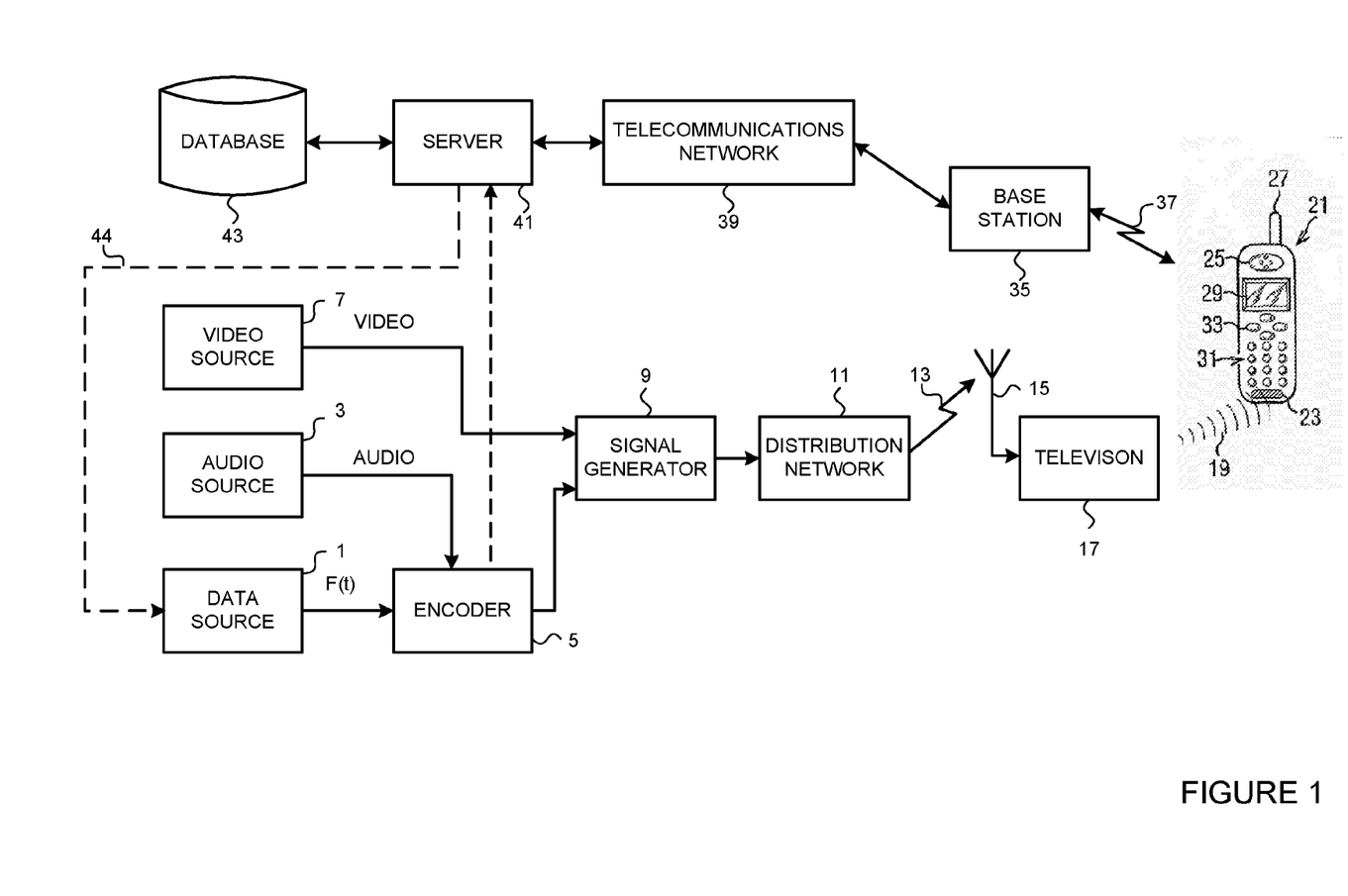
FIG. 1 schematically shows a signalling system for communicating data to a cellular telephone via the audio portion of a television signal.

FIG. 1 illustrates a first embodiment of the invention in which code words F(t), generated by a data source 1, are encoded within an audio track from an audio source 3 by an encoder 5 to form a modified audio track for a television programme. In this embodiment, the code words F(t) include identification code words and synchronising code words for synchronising the operation of a software application running on a user's mobile telephone 21 with the television programme. When the encoder 5 encodes the code words into the audio, it passes timing information to a server 41, which timing information identifies where each code word has been embedded within the audio signal (for example relative to a start of the audio signal). As will be described in more detail below, this timing information is used to control the operation of the user's mobile telephone 21 in synchronism with the audio of the television programme. As shown in FIG. 1, the modified audio track output by the encoder 5 is then combined with the corresponding video track, from a video source 7, in a signal generator 9 to form a television signal conveying the television programme. In this embodiment, the data source 1, the audio source 3, the video source 7 and the encoder 5 are all located in a television studio and the television signal is distributed by a distribution network 11 and, in this embodiment, a radio frequency (RF) signal 13. The RF signal 13 is received by a television aerial 15 which provides the television signal to a conventional television 17. The television 17 has a display (not shown) for showing the video track and a loudspeaker not shown for outputting the modified audio track as an acoustic signal 19.

As shown, in this embodiment, the cellular telephone 21 detects the acoustic signal 19 emitted by the television 17 using a microphone 23 which converts the detected acoustic signal into a corresponding electrical signal. The cellular telephone 21 then processes the electrical signal to recover the hidden code words F(t). The cellular telephone 21 also has conventional components such as a loudspeaker 25, an antenna 27 for communicating with a cellular base station 35, a display 29, a keypad 31 for entering numbers and letters and menu keys 33 for accessing menu options. The data recovered from the audio signal can be used, for example, to synchronise a software application running on the cellular telephone 21 with the television programme being shown on the television 17. For example, there may be a quiz show being shown on the television 17 and the cellular telephone 21 may be arranged to generate and display questions relating to the quiz that are shown in synchronism with the quiz show. The questions may, for example, be obtained from the server 41 and stored together with timing information that defines the timing that the questions are to be output to the user relative to the timing that the synchronisation codes are recovered from the audio.

At the end of the quiz show, the answers input by the user into the cellular telephone 21 (via the keypad 31) can then be transmitted to a remote server 41 via the cellular telephone base station 35 and the telecommunications network 39. The server 41 can then collate the answers received from a large number of users and rank them based on the number of correct answer given and the time taken to input the answers. This timing information could also be determined by the cellular telephone 21 and transmitted to the server 41 together with the user's answers. As those skilled in the art will appreciate, the server 41 can also process the information received from the different users and collate various user profile information which it can store in the database 43. This user profile information may then be used, for example, for targeted advertising.

After the server 41 has identified the one or more "winning" users, information or a prize may be sent to those users. For example, a message may be sent to them over the telecommunications network 39 together with a coupon or other voucher. As shown by the dashed line 44 in FIG. 1, the server 41 may also provide the data source 1 with the data to be encoded within the audio.

As mentioned above, the inventors have realised that the way in which the data is hidden in the audio signal can be improved to make it easier for the telephone 21 to synchronise with the television programme. One improvement that they have made is to insert pairs of code words distributed throughout the audio programme, with each pair of code words including an identification (ID) code word and a synchronisation code word. Typically, the ID code words within a given television programme will be the same whilst the synchronisation code words are unique within the television programme. Different television programmes will have different ID code words and the synchronisation code words used in one television programme may also be used in another television programme. The inventors have found that this arrangement helps to speed up synchronisation whilst making efficient use of available code words.

Data Hiding

There are various ways in which the code words can be hidden within the audio signal and the reader is referred to the paper by Bender entitled "Techniques For Data Hiding", IBM Systems Journal, Vol 35, no 384, 1996, for a detailed discussion of different techniques for hiding data in audio. In the present embodiment, the data is hidden in the audio by adding an echo to the audio, with the polarity or the time delay of the echo being varied to encode the data. This variation may be performed, for example by using a simple no echo corresponds to a binary zero and an echo corresponds to a binary one scheme. Alternatively, a binary one may be represented by the addition of an echo at a first delay and a binary zero may be represented by the addition of an echo at a second different delay. The sign of the echo can also be varied with the data to be hidden. In a more complex encoding scheme a binary one may be represented by a first combination or sequence of echoes (two or more echoes at the same time or applied sequentially) and a binary zero may be represented by a second different combination or sequence of echoes.

Figure 2A:
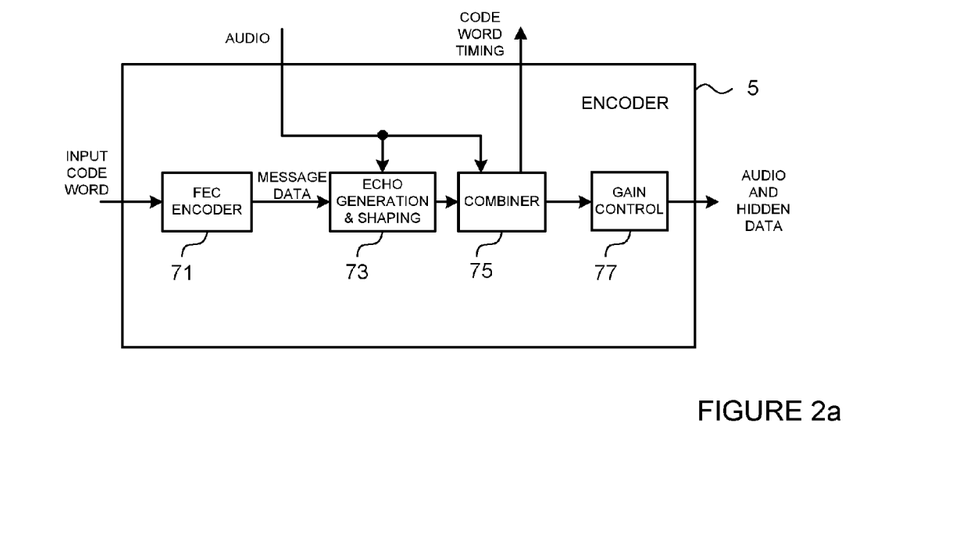
FIG. 2a is a block schematic diagram illustrating the processing performed by an audio encoder forming part of the system shown in FIG. 1.

More details of such echo encoding techniques can be found in the applicant's earlier application WO2009/144470, the contents of which are hereby incorporated by reference. However, for completeness, a brief description of the encoding process will now be given with reference to FIG. 2. FIG. 2a is a block diagram illustrating the main components of the encoder block 5 shown in FIG. 1. As shown, the encoder 5 includes an FEC encoder 71 that encodes each code word separately from the other code words to generate respective message data for each code word. The message data output from the FEC encoder 71 is passed to an echo generation and shaping module 73, which also receives the audio signal in which the message data is to be hidden. The echo generation and shaping module 73 then generates echoes of the audio which depend upon the message data to be transmitted. The generated echoes are then combined with the original audio signal in a combiner module 75. The combiner module 75 also records timing information for each code word (or at least for each synchronisation code word) that defines the time point within the audio signal that the code word has been encoded (for example the time from the start of the audio signal to the point in the audio signal corresponding to the end of the code word). This timing information is supplied to the server 41, where the timing information can be combined with actions that are to be performed at given times within the audio. The modified audio signal output from the combiner module 75 is then passed to a gain control module 77 for appropriate gain control before the audio signal with the hidden data is ready for combining with the corresponding video signal.

Figure 2B:
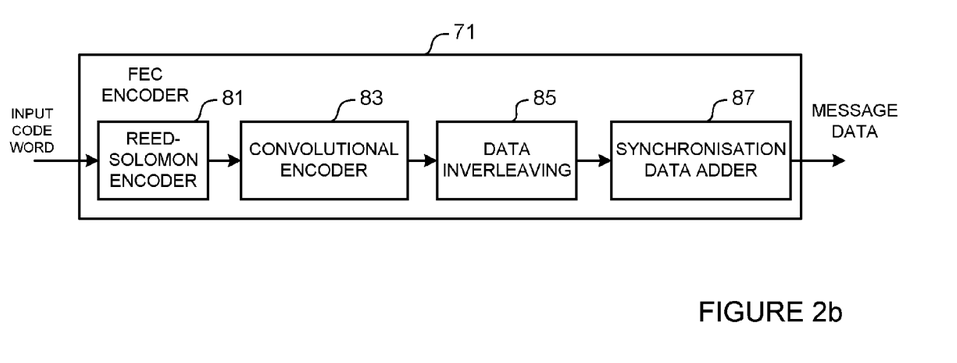

FIG. 2b is a block diagram illustrating the main components of the FEC encoder module 71 used in this embodiment. Each code word that is input to the FEC encoder 71 is processed separately, so that the encoding and subsequent decoding of each code word can be independent of the encoding and decoding of other code words. As shown, in this embodiment, the FEC encoder 71 has a Reed-Solomon encoder module 81 which uses a shortened (13, 6) block code to represent the input code word. The data output from the Reed-Solomon encoder 51 is then passed to a convolutional encoder 83 which performs convolutional encoding on the data. The data bits output from the convolutional encoder 83 are then interleaved with each other by a data interleaving module 85 to protect against errors occurring in bursts. Finally, a synchronisation data adder module 87 adds a sequence of synchronisation bits that will help the telephone 21 to lock on to the encoded data within the received acoustic signal 3. The output from the synchronisation data adder module 87 represents the message data for the input code word which is then passed to the echo generation and shaping module 73.

Figure 2C:
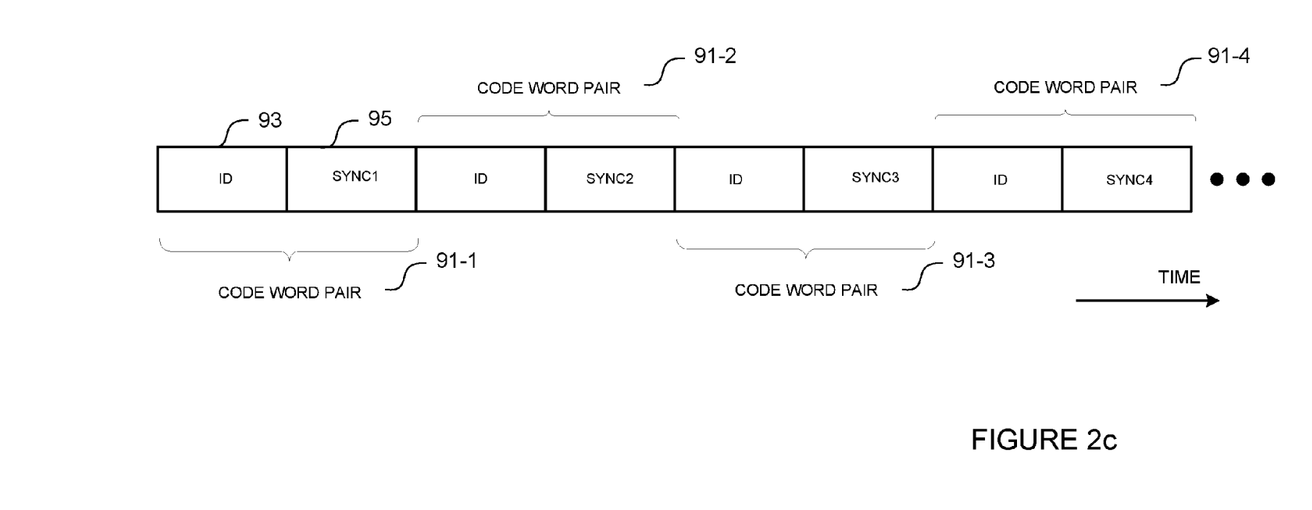
Figure 2D:
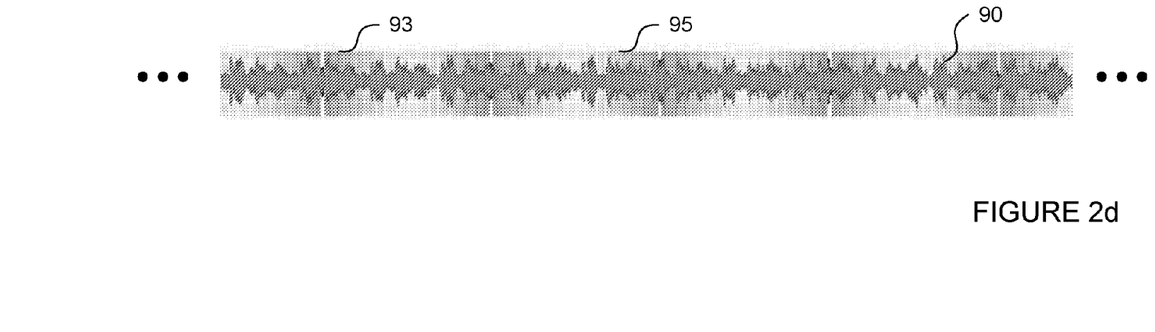

FIGS. 2c and 2d are timing sequences illustrating the way in which the code words are encoded and added into the audio signal 90. In particular, in this embodiment, pairs 91-1 to 91-4 of code words are added. Each pair 91 of code words includes an ID code word 93 and a synchronisation code word 95. As discussed above, the ID code words 93 are all the same and the synchronisation code words 95 are all unique within the television programme being encoded. The synchronisation code words 95 are preferably related to each other—as this can help with the decoding (as will be discussed below). For example, the synchronisation code words 95 may increment by a defined amount (e.g. by one) from one synchronisation code word to the next. In this embodiment, the pairs 91 of code words are continuously added to the audio of the television programme—so that a second pair 91 of code words is added immediately after a first pair 91, until the end of the audio signal. This facilitates the decoding process as once the telephone 21 has found one code word, it can use the end boundary of that code word as the start boundary for the next code word etc.

As will be described in more detail below, the ID code words 93 allow the telephone 21 to identify the television programme and hence the corresponding set of actions that it should take during the programme; and the synchronisation code words 95 allow the telephone 21 to synchronise the performance of the actions it has to take with the television programme.

Cellular Telephone

Figure 3:
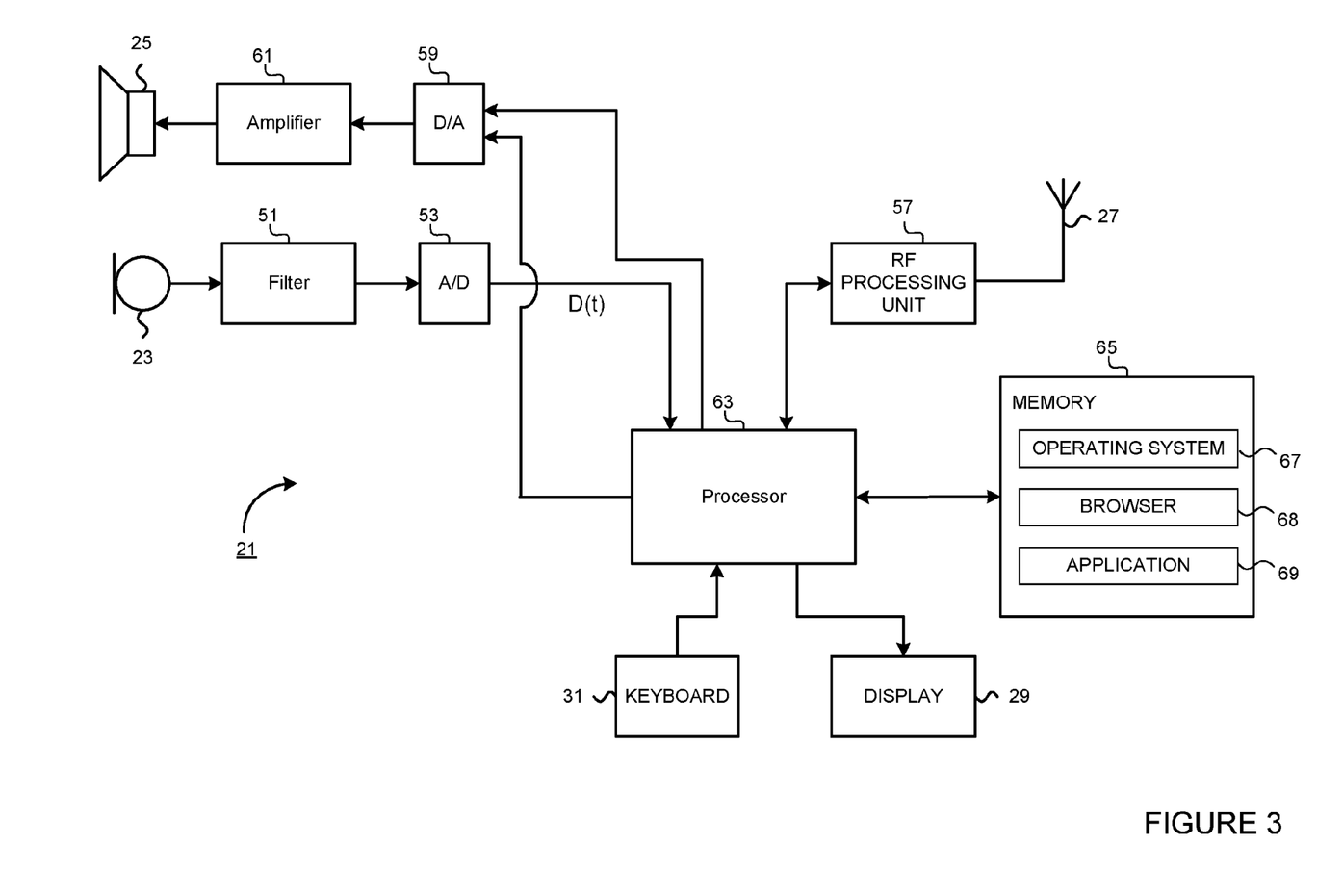
FIG. 3 is a schematic block diagram illustrating the main components of a cellular telephone including software applications for recovering data hidden within a received audio signal.

FIG. 3 illustrates the main components of the cellular telephone 21 used in this embodiment. As shown, the cellular telephone 21 includes a microphone 23 for receiving acoustic signals (such as the user's voice or the audio of the television programme carrying the hidden code words) and for converting them into electrical equivalent signals. These electrical signals are then filtered by the filter 51 to remove unwanted frequencies typically outside the frequency band of 300 Hz to 3.4 kHz. The filtered audio is then digitised by an analog to digital converter 53, which samples the filtered audio typically at a sampling frequency of 8 kHz and representing each sample by a 13 to 16 bit digital value. The stream of digitised audio (D(t)) is then input to a processor 63 (which may comprise one or more processing units). When making a voice call, the processor 63 compresses the received audio and then passes it to an RF processing unit 57 which modulates the compressed audio data onto one or more RF carrier signals for transmission to the base station 35 via the antenna 27. Similarly, compressed audio signals received via the antenna 27 are fed to the RF processing unit 57, which demodulates the received RF signals to recover the compressed audio data from the RF carrier signal(s), which is then passed to the processor 63 for decompression. The regenerated audio samples are then output to the loudspeaker 25 via the digital to analog converter 59 and the amplifier 61.

As shown in FIG. 3a, the processor 63 is controlled by software stored in memory 65. The software includes operating system software 67 (for controlling the general operation of the cellular telephone 21), a browser 68 for accessing the internet and application software 69 for providing additional functionality to the cellular telephone 21. In this embodiment, the application software 69 is configured to cause the cellular telephone 21 to interact with the television programme in the manner discussed above. To do this, the application software 69 is arranged to receive and process the audio signal of the television programme it receives via the microphone 23 to recover the hidden code words F(t) which controls the application software 69.

Figure 4A:
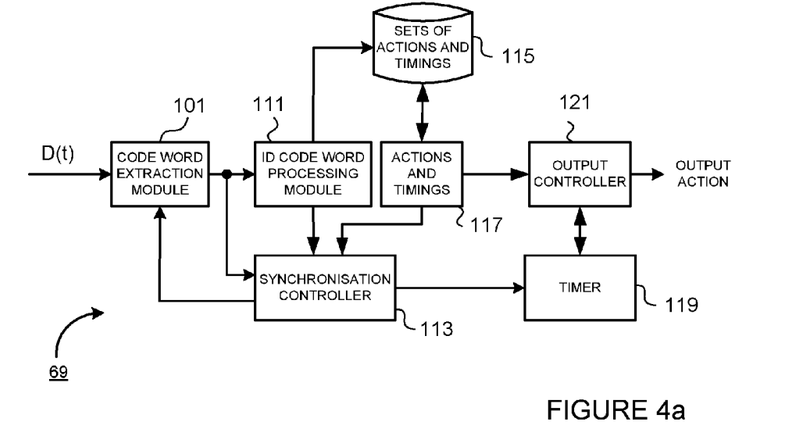
FIG. 4a is a schematic block diagram illustrating the main processing modules of the software application that process the audio signal to recover the data hidden therein.
Figure 4B:
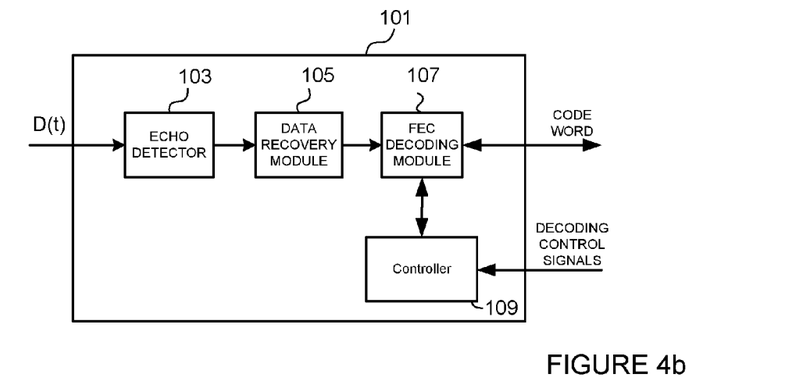
Figure 5:
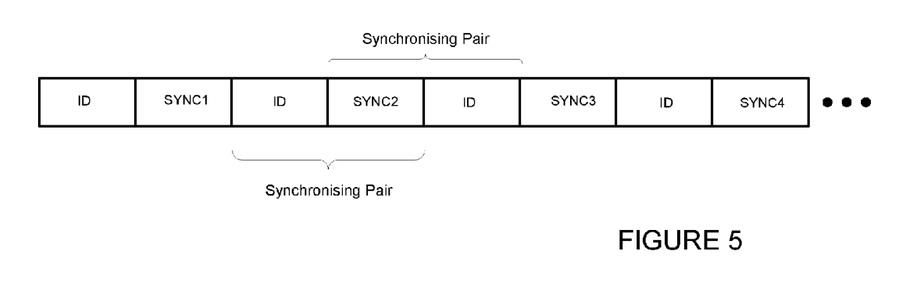
FIG. 5 is a timing sequence illustrating the beneficial way in which the software application can synchronise with the audio signal using an ID code word and a synchronisation code word.

FIG. 4a is a block diagram illustrating the main functional modules of the software application 69. As shown, the application software 69 includes a code word extraction module 101 that processes the audio signal samples from the A/D converter 53 to recover the code words hidden therein. FIG. 4b is a block diagram illustrating the main components of the code word extraction module 101. As shown, there is an echo detector 103 that detects echoes in the received audio signal and a data recovery module 105 that processes the echoes to determine data values represented thereby. Initially the echo detector 103 does not know where each symbol period begins and ends or where the start of the data message is located. Therefore, the echo detector 103 analyses a block of samples each time that a new sample arrives to determine if it contains the echoes that carry a hidden data symbol. The output from the echo detector 103 is then analysed by the data recovery module 105 to determine the most likely symbol boundaries. The data recovery module 105 then determines the location of the start of the message by finding the synchronisation bits that were added by the synchronisation data adder 87. At this point, the data recovery module 105 can start to recover the whole data message. Once synchronisation has been obtained, because the code words are continuously hidden within the audio, the echo detector 103 can use the determined symbol boundaries and message boundaries for the current code word to determine approximate symbol and message boundaries for the next hidden code word—which reduces the amount of processing required to recover the hidden code words.

The message data output by the data recovery module 105 is then processed by an FEC decoding module 107 which reverses the FEC encoding performed by the FEC encoder 71 to regenerate the code word which it outputs. In this embodiment, the FEC decoding module 107 has a blind decoding mode of operation and a non-blind decoding mode of operation. A controller 109 is provided to control the mode of operation of the FEC decoding module 107 in dependence upon decoding control signals. In particular, in the blind decoding mode of operation, the FEC decoding module 107 processes the incoming data messages without using any a priori information about the possible code word contained therein. In the non-blind decoding mode of operation, the FEC decoding module 107 uses a priori information about the expected code word to try to improve the decoding process. In particular, with the alternating structure of ID code word 93 and synchronisation code word 95 used in the present embodiment, if the previous code word was a synchronisation code word 95, then the next code word should be an ID code word 93. Further since the same ID code word is used throughout the television programme, the value of the expected ID code word should be the same as the value of the previous ID code word. Similarly, if the previous code word that was decoded was an ID code word, then the next code word should be a synchronisation code word 95; and since the value of one synchronisation code word is related to the previous synchronisation code word (incremented by one, for example), the expected value of the next synchronisation code word can also be determined in advance. Additionally or alternatively, the telephone 21 may know in advance all of the code words that are encoded within the television programme and the order in which they appear. Therefore, once the telephone 21 has decoded one code word, it can determine an expected next code word from the pre-stored information. In either case, the FEC decoding module 107 can use this knowledge of the expected next code word to control its decoding process—for example, using a correlation process, a maximum likelihood process or a Viterbi process.

In one embodiment, the FEC decoding module 107 normally operates in the blind decoding mode of operation; and if the confidence in the code word output falls below a threshold or if a code word is not detected at all, then the controller 109 switches the FEC decoding module 107 to operate in the non-blind decoding mode of operation. Alternatively, the controller 109 may control the operation of the FEC decoding module 107 so that it operates in the blind decoding mode until the telephone 21 has synchronised itself with the codes in the audio signal, at which point the controller 109 switches the FEC decoding module 107 to operate in its non-blind decoding mode of operation; switching back to the blind decoding mode if the telephone 21 loses synchronisation with the code words in the received audio signal.

Returning to FIG. 4*a*, the extracted code words are passed to an ID code word processing module 111 and to a synchronisation controller 113. The ID code word processing module 111 ignores the synchronisation code words and processes the ID code words. In particular, the ID code word processing module 111 initially uses the extracted ID code word 93 to retrieve an actions and timings file 117 from the database 115. The actions and timings file 117 obtained from the database 115 are specific to the television programme in which the code words have been hidden. The database 115 may store actions and timings files 117 for a range of different television programmes that were or are scheduled to be broadcast over a given period—such as over the last week and the next 24 hours. The timings are the timings identified by the encoder 5 during the encoding of the audio signal (or are timings derived therefrom) and the actions are the actions determined by the server 41 to be performed by the telephone 21 during the television programme. The actions and timings file 117 for each television programme may be downloaded from the server 41 to the database 115 over the wireless radio link or they may be provided to the telephone 21 on a memory card.

As discussed above, the ID code words 93 in a television programme are the same. Therefore, if the ID code word processing module 103 detects a new ID code word, then it assumes that the user has changed channel and it informs the synchronisation controller 105 accordingly. The ID code word processing module 111 also stops the operation of the output controller 121. The ID code word processing module 111 may wait for the next ID code word 93 to confirm the change of ID code word before stopping the output controller 121—just in case the detected new ID code word was erroneously decoded. If the new ID code word is confirmed, then the ID code word processing module 103 retrieves the actions and timings file 117 for the new television programme corresponding to the new code word that has been detected from the local database 115 (if it is available) or from a remote database (not shown) if it is not stored locally.

The synchronisation controller 113 also receives the code words output from the code word extraction module 101 and the actions and timings file 117 retrieved from the database 115. The synchronisation controller 113 uses the synchronisation code words 95 that are detected in the audio signal to control a timer 119 used to control the time when the actions (defined in the actions and timings file 117) should be performed. In particular, the actions and timings file 117 for the television programme include a list of actions to be performed by the telephone 21 and the time when each action should be performed. The time is defined, for example, relative to the start of the television programme or relative to a previous event. The timer 119 is synchronised to that start point or to the previous event, so that the output controller 121 can output the action to be performed at the correct timing. For example, the actions and timings file 117 may define that a given action should take place 12 minutes and 23 seconds from the start of the television programme. The timer 119 is synchronised with the start of the show so that the relevant action is performed at the correct time. Whilst it is possible to set the timer 119 at the start of the television programme and let it "free wheel" to control the outputting of the actions, since the user may be able to control the play back speed (for example using pause, fast forward or rewind etc.), the actions and timings file 117 includes the timing of when each synchronisation code word 95 appears in the audio signal. In this way, the synchronisation controller 113 can compare the actual timer value when a synchronisation code word 95 is received with the expected timer value (as defined in the actions and timings file 117) and change the timer 119 using the difference in time between the actual time and the expected time. In this way, if the user does skip sections of the television programme, the timer 119 will be updated upon receipt of the next synchronisation code word, so that the relevant actions are output and performed at the correct timing.

Since the telephone 21 may be located in a noisy environment, some of the code words may not be detected by the code word extraction module 101. Therefore, the output controller 121 is designed to output the subsequent actions in accordance with the actions and timing file 117 when the timer 119 shows the corresponding time. In this way, the performance of a given action does not depend on correctly detecting a corresponding synchronisation code word. Action triggering has been separated from the task of correctly decoding the code words.

In this embodiment, since the synchronisation controller 113 has the actions and timings file 117, it knows what synchronisation code words to expect. If a synchronisation code word is received that does not match one of the expected code words, then the synchronisation controller 113 will stop the operation of the output controller 121. It may do this immediately or it may wait until after decoding the next synchronisation code word to see if the last code word was an error or if the user has perhaps changed channel and is now watching another television programme—that is also encoded with similar code words.

When the telephone 21 has synchronised with the code words in the incoming audio, the synchronisation controller 113 also determines and sends the next expected code word to the code extraction module 101 (as the decoding control signals) for use in controlling the way in which the FEC decoding module 107 decodes the message data (using the blind or the non-blind decoding mode of operation discussed above).

The actions output by the output controller 121 cause the application software 69 to perform the defined action—such as to generate and output data (such as questions for the user) on the display 29 and to receive the answers input by the user via the keypad 31. The software application 69 then transmits the user's answers to the remote server 41 (identified by a pre-stored URL, E.164 number or the like) together with timing data indicative of the time taken by the user to input each answer (calculated by the software application 69 using an internal timer (not shown)). The software application 69 may also display result information received back from the server 41 indicative of how well the user did relative to other users who took part in the quiz.

Advantages

As discussed above, one of the advantages of inserting pairs of ID code words 93 and synchronisation code words 95 is that it allows for fast synchronisation to the audio stream. In particular, because the ID code words 93 are encoded into the audio separately from the synchronisation code words 95, the synchronisation controller 113 can synchronise to the incoming audio by detecting an ID code word 93 and then a synchronisation code word 95 or by detecting a synchronisation code word 95 and then an ID code word 93. This can result in a significant saving in terms of the time needed to achieve synchronisation. In particular, with the echo encoding process used in this embodiment (which has a very low bit rate), each code word may be encoded over approximately 5 to 30 seconds of the television audio, depending on the encoding performed by the FEC encoder. If every code word were to be unique and the same coding space is assumed (i.e. a code space having the same number of unique code words as there are unique combinations of code word pairs 91) then every code word would need to be about twice the length of the code words used in this embodiment. Therefore, if the telephone 21 started to try to decode the audio just after the start of one such long code word, the telephone 21 would have to wait until the end of the next full code word before it will be synchronised with the audio. However, by splitting up the long code words into two shorter code words—a common ID code word and a unique synchronisation code word, and by allowing the synchronisation controller 113 to synchronise onto an ID code word 93 and then a synchronisation code word 95 or a synchronisation code word 95 and then an ID code word 93, the worst case delay in achieving synchronisation can be reduced by a quarter.

In addition to the benefit of fast synchronisation when the telephone 21 starts the decoding process, the split approach to the code words used in this embodiment also facilitate fast re-synchronisation—for example if the user skips ahead in the audio stream or skips back or if there is a break in the encoding. Under these circumstances, the next synchronisation code word received by the code word extraction module 101 and forwarded to the synchronisation controller 113 will appear out of order and therefore cause the timer 119 to be reset to the appropriate point in the audio as described earlier. These scenarios are illustrated in FIG. 6.

Figure 6A:
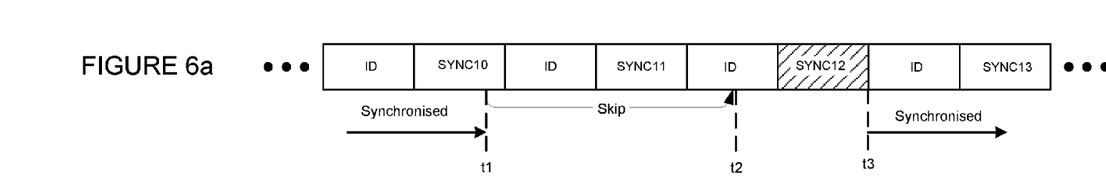
FIG. 6a is a timing sequence illustrating the way in which the software application can re-synchronise with the code words in the audio in the event of a skip forward event.

In particular, FIG. 6a illustrates a scenario where a user decides to skip ahead at time t1 to time t2 (corresponding to the middle of an ID code word 93). In this embodiment, however, the synchronisation controller 113 assumes that the user has not changed television programme and so the ID code words 93 will be the same. Therefore, the synchronisation controller 113 can re-synchronise with the audio after decoding the next synchronisation code word 95 (in this case SYNC12) at time t3.

Figure 6B:
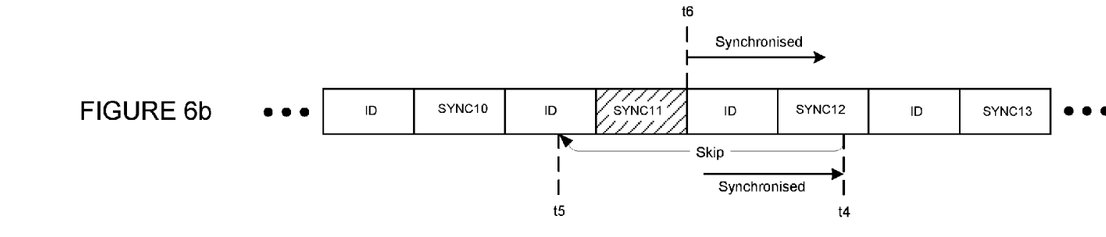
FIG. 6b is a timing sequence illustrating the way in which the software application can re-synchronise with the code words in the audio in the event of a skip back event.

FIG. 6b illustrates a scenario where a user decides to skip back at time t4 to time t5 (corresponding to the middle of an ID code word 93). Again, the synchronisation controller 113 assumes that the user has not changed television programme and so the ID code words 93 will be the same. Therefore, the synchronisation controller 113 can re-synchronise with the audio after decoding the next synchronisation code word 95 (in this case SYNC11) at time t6. Also by comparing the synchronisation code word after re-synchronisation with the previous synchronisation code word, the system can detect that the user has skipped forwards/backwards in the media programme.

Figure 6C:
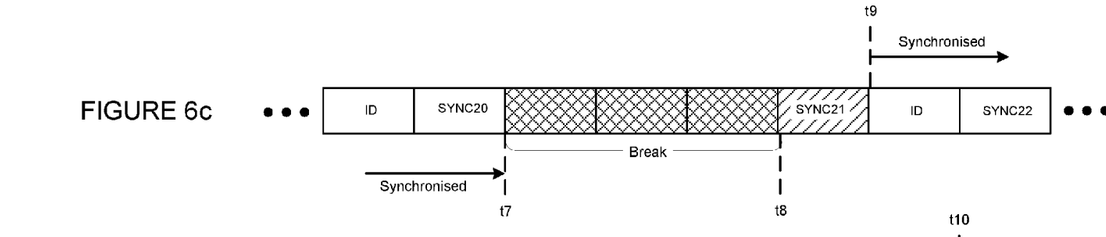
FIG. 6c is a timing sequence illustrating the way in which the software application can re-synchronise with the code words in the audio in the event of a break in the audio coding.

FIG. 6c illustrates a scenario where a break in the coding is inserted in the audio signal. Such breaks may occur because this part corresponds to a portion of the television audio that is very quiet or it may correspond to a point at which adverts have been inserted into the television programme. In this case the break in the encoding starts at time t7 and ends at time t8. The synchronisation controller 113 synchronises with the audio again at time t9 after decoding the synchronisation code (SYNC21). As can be seen from FIG. 6c, the first code word after the end of a break is preferably a synchronisation code word 95—as this minimises the time that the synchronisation controller 113 will take to re-synchronise with the audio of the television programme after the break. In cases where there are known break points within the programme for adverts, the database 115 may store an indication that synchronisation loss occurs at the break point. If the duration of the advert break is known, then the database may also store data indicating when the next code word is to be found. However, in many cases although the break point will be known in advance, the length of the advert break will not be known in advance.

Figure 6D:
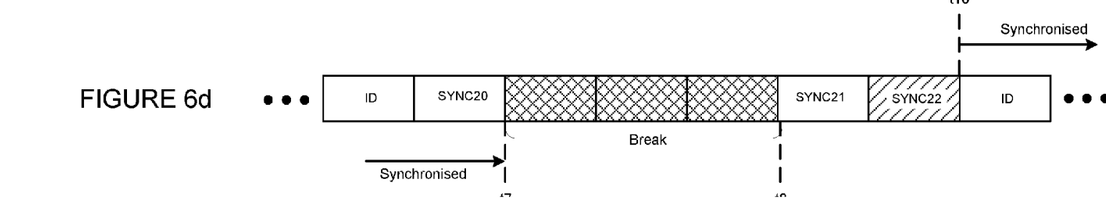
FIG. 6d is a timing sequence illustrating the optional insertion of at least one additional synchronisation code word in the audio to assist in the re-synchronisation of the software application with the code words in the audio in the event of a break in the audio encoding.

Additionally, in the preferred embodiment, one or more additional synchronisation code words 95 are inserted after a break—as this allows the synchronisation controller 113 to re-synchronise quickly even if the first one or two code words can't be detected in the audio signal—perhaps because the television programme has been altered to adjust for a desired length of advert break whilst keeping the television programme to a set duration in the television schedule; or because background noise (which tends to be higher during advert breaks) prevented the correct decoding of the first code word after the break. Such additional synchronisation code words are illustrated in FIG. 6d, which shows two consecutive synchronisation code words (SYNC21 and SYNC22) after the break. In this example, the first code word may not be detected, in which case the synchronisation controller 113 can re-synchronise with the audio after decoding SYNC22 at time t10.

Modifications and Further Alternatives

A number of embodiments have been described above illustrating the way in which ID code words 93 and synchronisation code words 95 are hidden within an audio signal in code word pairs. As those skilled in the art will appreciate various modifications and improvements can be made to the above embodiments and some of these modifications will now be described.

Figure 7:
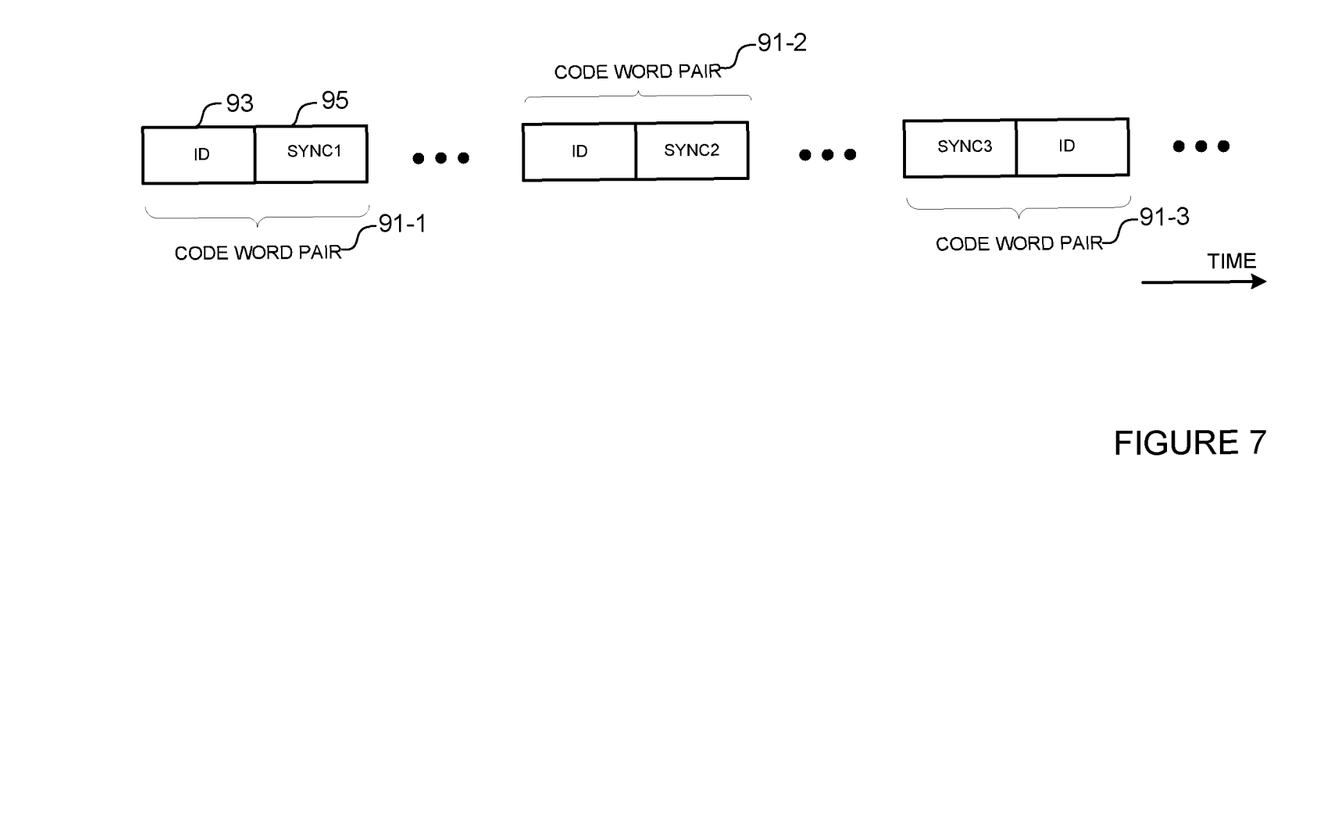
FIG. 7 illustrates an alternative way that code word pairs may be inserted within the audio signal.

In the above embodiments, the pairs of code words were continuously embedded within the audio signal. This is not essential. The pairs of code words may be distributed within the audio signal such that there are gaps (time periods in which the audio signal does not carry hidden data) between adjacent pairs of code words. Such an arrangement is illustrated in FIG. 7, which also shows that the order of the code words in each pair does not need to be the same. This may be useful when inserting a code word pair after a break—so that the first code word after the break is a synchronisation code word. In the above embodiment, the pairs of code words were added to the audio in an alternating fashion. Whilst this is preferred, it is not essential, as additional code words may be added between the pairs of code words. An example of such an embodiment is illustrated in FIG. 6d.

In the above embodiments, the various processing of the audio samples was performed by software running on the cellular telephone. As those skilled in the art will appreciate, some or all of this processing may be formed by dedicated hardware circuits, although software is preferred due to its ability to be added to the cellular telephone after manufacture and its ability to be updated once loaded. The software for causing the cellular telephone to operate in the above manner may be provided as a signal or on a carrier such as compact disc or other carrier medium. Additionally, instead of using a cellular telephone to perform the various processing discussed above, other portable devices may be used, such as laptop computers, PDAs, tablet computers and the like.

In the above embodiment, the television programme was transmitted to the user via an RF communication link 13. As those skilled in the art will appreciate, the television programme may be distributed to the user via any appropriate distribution technology, such as by cable TV, the Internet, Satellite TV etc. It may also be obtained from a storage medium such as a DVD or BD and read out by an appropriate DVD/BD player.

In the above embodiments, the cellular telephone picked up the audio of a television programme. As those skilled in the art will appreciate, the above techniques can also be used where the audio is obtained from a radio or other loudspeaker system, such as in cinemas or in other live stage shows.

In the above embodiments, it was assumed that the code words were hidden within the audio at the television studio end of the television system. In an alternative embodiment, the code words may be hidden within the audio at the user's end of the television system, for example, by a set top box during play-out or during recording if the programme is being recorded locally. The set top box may be adapted to hide the appropriate data into the audio prior to outputting the television programme to the user.

In the above embodiment, synchronisation bits were added to the data that was transmitted so that the decoder can identify the boundaries of each symbol period and the start and end of each message. The use of such synchronisation bits significantly increases the overall message length that has to be transmitted (in some cases by as much as 25%). Additionally, as the decoding of each bit is subject to noise, the matching is not perfect which can reduce the chances of a successful synchronisation. As described in the applicant's earlier patent application WO2009/144470, the synchronisation bits are not required. In particular, the FEC decoding module 41 will have higher error rates when the echo detector 103 is not properly synchronised with the incoming data compared with its error rate when the echo detector is synchronised with the incoming data. Therefore, it is possible to use the error rate output from the FEC decoding module 107 to control the synchronisation of the receiver to the incoming data.

As those skilled in the art will appreciate, the techniques described above for hiding data within the audio may be done in advance of the transmission of the acoustic signal or it may be done in real time. Even in the case where the data is to be embedded within an audio signal in real time, some of the processing can be done in advance. For example, the FEC encoding may be performed on the data in advance so that only the echo generation and echo shaping is performed in real time.

In order to keep the obtrusiveness of the added echoes to a minimum, the data rate of the encoded data is preferably kept between one and twenty symbols per second. This corresponds to a symbol period of between 50 ms and 1 second. In some embodiments, a long symbol period is beneficial because the added echoes will span across spoken words within the audio, making it easier to hide the data echoes within the audio. A larger symbol period also reduces audibility of the echoes. This is because humans are more sensitive to changing echoes than they are to static or fixed echoes. Therefore, by having a longer symbol period, the rate of change of the echoes is lower making the presence of the echoes less noticeable to a user.

Typically, the data rate of the data added to the audio signal in the transmitter is constant and is known by the receiver. This knowledge reduces the complexity of the receiver circuitry for locking on to the data within the received signal. However, it is not essential to the invention and more complex circuitry may be provided in the receiver to allow the receiver to try different data rates until the actual data rate is determined. Similarly, the receiver may use other techniques to synchronise itself with the transmitted data so that it knows where the symbol boundaries are in advance of receiving the data.

In the above embodiment, FEC encoding techniques were used to allow the receiver to be able to correct errors in the received data. As those skilled in the art will appreciate, such encoding techniques are not essential to the invention. However, they are preferred, as they help to correct errors that occur in the transmission process over the acoustic link.

In the embodiment described above, a single transmitter was provided together with a receiver. As those skilled in the art will appreciate, multiple transmitters and/or multiple receivers may be provided. Further, the components of the transmitter may be distributed among a number of different entities. For example, the encoding and data hiding part of the transmitter may be provided within a head end of a television distribution system or a user's set top box.

In a further modification, multiple data code words may be encoded "on top of each other"—at the same point in the audio, for example using different echo lags, provided the code words do not interfere with each other. The way in which this can be achieved is described in the applicant's earlier applications discussed above.

In the above embodiments, a number of processing modules and circuits have been described. As those skilled in the art will appreciate, these processing modules and circuits may be provided as hardware circuits or as software modules running within memory of a general purpose processor. In this case, the software may be provided on a storage medium such as a CD-ROM or it may be downloaded into an appropriate programmable device on a carrier signal over a computer network, such as the internet. The software may be provided in compiled form, partially compiled form or in un-compiled form.

As those skilled in the art will appreciate, the precise values of the bit rates, sampling rates etc described in the above embodiments are not essential features of the invention and can be varied without departing from the invention.

The invention claimed is:

1. A method of synchronising a device with an audio signal having encoded pairs of code words embedded separately therein, each pair of code words including an ID code word and a synchronisation code word, the method comprising:
   receiving the audio signal with the encoded pairs of code words;
   synchronising the device with the audio signal by detecting: i) an ID code word and a synchronisation code word from one pair of code words; or ii) an ID code word from one pair of code words and a synchronisation code word from another pair of code words; and
   using a detected ID code word to retrieve timing information relating to an expected time for detected synchronisation code words and determining a difference in time between an expected time for a detected synchronisation code word and an actual time of the detected synchronisation code word and using the determined difference to synchronise the device to the audio signal.

2. A method according to claim 1, wherein the timing information defines an expected time relative to a defined point within the audio signal, such as the start of the audio signal.

3. A method according to claim 1, comprising using the determined difference to alter a timer of the device.

4. A method according to claim 1, further comprising storing action information that defines one or more actions that the device should take at defined times during the reception of the audio signal.

5. A method according to claim 1, comprising using a first decoding technique to decode the encoded code words in the received audio signal before synchronisation and using a second decoding technique to decode the encoded code words after synchronisation.

6. A method according to claim 1, comprising using a first decoding technique to decode the encoded code words in the received audio signal and using a second decoding technique to decode the encoded code words in the event that an expected code word is not detected.

7. A non-transitory computer program product comprising computer implementable instructions for causing a programmable computer device to perform all the method steps of claim 1.

8. A method of synchronising a device with an audio signal having encoded pairs of code words embedded separately therein, each pair of code words including an ID code word and a synchronisation code word, the method comprising:
   receiving the audio signal with the encoded pairs of code words;
   synchronising the device with the audio signal by detecting: i) an ID code word and a synchronisation code word from one pair of code words; or ii) an ID code word from one pair of code words and a synchronisation code word from another pair of code words;
   using a first decoding technique to decode the encoded code words in the received audio signal before synchronisation and using a second decoding technique to decode the encoded code words after synchronization;
   wherein the first decoding technique is a blind decoding technique and the second decoding technique is a non-blind decoding technique.

9. A method of synchronising a device with an audio signal having encoded pairs of code words embedded separately therein, each pair of code words including an ID code word and a synchronisation code word, the method comprising:
   receiving the audio signal with the encoded pairs of code words;
   synchronising the device with the audio signal by detecting: i) an ID code word and a synchronisation code word from one pair of code words; or ii) an ID code word from one pair of code words and a synchronisation code word from another pair of code words;
   wherein after synchronising the device to the audio and in response to a skip within the received audio signal, maintaining the ID code word and re-synchronising with the audio signal by detecting a synchronisation code word.

10. An apparatus for synchronising a device with an audio signal having encoded pairs of code words embedded separately therein, each pair of code words including an ID code word and a synchronisation code word, the method comprising:
   a receiver configured to receive the audio signal with the encoded pairs of code words; and
   a synchronisation controller configured to synchronise the device with the received audio signal by detecting:
   i) an ID code word and a synchronisation code word from one pair of code words;
   or
   ii) an ID code word from one pair of code words and a synchronisation code word
   from another pair of code words;
   a code word extracting module that uses a first decoding technique to decode the encoded code words in the received audio signal before synchronisation and that uses a second decoding technique to decode the encoded code words after synchronization;
   wherein the first decoding technique is a blind decoding technique and the second decoding technique is a non-blind decoding technique.

11. An apparatus for synchronising a device with an audio signal having encoded pairs of code words embedded separately therein, each pair of code words including an ID code word and a synchronisation code word, the method comprising:
- a receiver configured to receive the audio signal with the encoded pairs of code words; and
- a synchronisation controller configured to synchronise the device with the received audio signal by detecting:
  - i) an ID code word and a synchronisation code word from one pair of code words; or
  - ii) an ID code word from one pair of code words and a synchronisation code word from another pair of code words;
- an ID code word processing module that uses a detected ID code word to retrieve timing information relating to an expected time for detected synchronisation code words; and wherein the synchronisation controller is arranged to determine means for determining a difference in time between an expected time for a detected synchronisation code word and an actual time of the detected synchronisation code word and to use the determined difference to synchronise the user device to the audio signal.

12. An apparatus according to claim 11, wherein the timing information defines an expected time relative to a defined point within the audio signal, including the start of the audio signal.

13. An apparatus according to claim 11, wherein the synchronisation controller is arranged to use the determined difference to alter a timer of the device.

14. An apparatus according to claim 11, further comprising storage that stores action information that defines one or more actions that the device should take at defined times during the reception of the audio signal.

15. An apparatus according to claim 11, comprising a code word extracting module that uses a first decoding technique to decode the encoded code words in the received audio signal before synchronisation and that uses a second decoding technique to decode the encoded code words after synchronisation.

16. An apparatus according to claim 11, comprising a code word extracting module that uses a first decoding technique to decode the encoded code words in the received audio signal and that uses a second decoding technique to decode the encoded code words in the event that an expected code word is not detected.

17. An apparatus according to claim 11, wherein the synchronisation controller is arranged to re-synchronise the device with the audio signal in response to a skip event within the received audio signal by maintaining a previously decoded ID code word and by detecting a new synchronisation code word after the skip event.

18. An apparatus according to claim 11, comprising a microphone for receiving an acoustic signal and wherein the receiver is configured to receive an audio signal obtained from the microphone.

* * * * *